UNITED STATES PATENT OFFICE 1,969,709

SICCATIVE COMPOSITION

Herman A. Bruson, Germantown, and Otto Stein, Drexel Hill, Pa., assignors to The Resinous Products & Chemical Co., Philadelphia, Pa.

No Drawing. Application December 13, 1932, Serial No. 646,964

21 Claims. (Cl. 134—57)

This invention relates to new and improved oil-soluble metal salts and to a process for accelerating the drying of autoxidizable coating compositions by the use of said salts. In addition this invention describes the synthesis of the acid intermediates used in preparation of the above oil-soluble salts.

We have found that the salts of polyvalent metals or of heavy metals with acids having the formula:

R—O—$C_nH_{2n}$—COOH where "$n$" is a whole number greater than (1) one, and where R is an alkyl group having more than (3) three carbon atoms, or wherein R is a hydroaromatic radicle or aralkyl group, are readily soluble in esters, ketones, hydrocarbons, and in vegetable, animal, and mineral oils.

The high degree of solubility of these new salts in petroleum naphthas and the extremely pale color and low viscosity of the resulting solutions, as well as their compatibility with drying oils and semi-drying oils, together with the effectiveness of these salts as oxidation catalysts, makes them especially valuable as siccatives for autoxidizable coating compositions of the most diverse nature such as linseed oil, tung oil, soya-bean oil, perilla oil and the like; as well as oleo-resinous varnishes, oil-paints, oil-enamels, linoleum, baking japans and printing inks, which are made from drying oils; and certain synthetic resins that dry by oxidation such as "alkyd" resins and "Glyptals" (a registered trade mark) which are obtained by heating polycarboxylic acids with polyhydric alcohols and drying oils or drying oil fatty acids. These new salts possess considerable advantages over the resinates, linoleats, naphthenates, tungates, benzoates, borates and similar well known siccatives in that these new salts are very much paler in color, and have a very much greater degree of solubility and stability in petroleum distillates or oleo-resinous varnishes on storage, particularly at low temperatures. They also cause less after-yellowing in white paints or varnishes on prolonged ageing than do the commonly used siccatives, and also show less tendency to form skins particularly in printing inks, when these are stored in cans open to the air.

These new salts are moreover easily and economically prepared by the novel process described herein from acids which have heretofore never been prepared and whose method of manufacture is therefore described herein in detail.

Typical ether acids from which these salts are derived and which belong to the class R—O—$C_nH_{2n}$—COOH where $n$ is a whole number greater than (1) one, and R is an alkyl group having more than (3) three carbon atoms, or (b) a hydroaromatic radicle or aralkyl group, are the following:

(a) Alpha- or beta butyloxypropionic acid, having the respective formula $C_4H_9$—O—$CH(CH_3)$—COOH and $C_4H_9$—O—$CH_2$—$CH_2$—COOH, or their higher homologues such as the alpha or beta amyloxy-, hexyloxy-, heptyloxy-, octyloxy-, nonyloxy-, decyloxy-, and lauryloxypropionic acids; the butyloxy-, amyloxy-, hexyloxy-, heptyloxy-, octyloxy-, nonyloxy-, decyloxy-, lauryloxy-, or cetyloxybutyric acids or the corresponding alkoxyisobutyric acids, alkoxyvaleric acids, alkoxycaproic acids and higher homologues thereof, viz, alkoxyheptoic acids, etc.

(b) Cyclohexyloxypropionic acid $C_6H_{11}$—O—$CH_2$—$CH_2$—COOH, cyclohexyloxybutyric acid $C_6H_{11}$—O—$CH(CH_3)$—$CH_2$—COOH bornyloxybutyric acid $C_{10}H_{17}$—O—$CH$—$(CH_3)$—$CH_2$—COOH Methylcyclohexyloxybutyric acid, fenchyloxybutyric acid, phenylethoxybutyric acid, cyclohexylisobutyric acid $C_6H_{11}$—O—$CH_2$—$C(CH_3)$—COOH, benzyloxybutyric acid, terpinyloxybutyric acid, and the corresponding ethers of hydroxyvaleric-, and higher homologues thereof.

According to the present invention these new acids are obtained in good yields by condensing a monohydric aliphatic alcohol of the type $C_nH_{2n+1}OH$ where "$n$" is greater than (3) three, or a monohydric aromatic or hydroaromatic alcohol, with an ester of an $\alpha$, $\beta$- unsaturated aliphatic monobasic acid in the presence of a small quantity of sodium or an alkali metal as a catalyst, and when reaction is complete, saponifying the ester of the ether-acid which is formed. Typical $\alpha$, $\beta$- unsaturated aliphatic monobasic acids the esters of which are suitable for this purpose are acrylic acid, crotonic acid, $\alpha$-methyl-acrylic acid, $\alpha$-ethyl-acrylic acid, $\alpha$-ethyl-$\beta$-propyl acrylic acid and the like, i. e. aliphatic monobasic acids containing the grouping $$X-CH=\underset{X}{C}-COOH$$

where X is hydrogen or an alkyl group. The reaction which occurs may be expressed for example as follows; using respectively (I)

acrylic ester, (II) crotonic ester, (III) α-methacrylic ester.

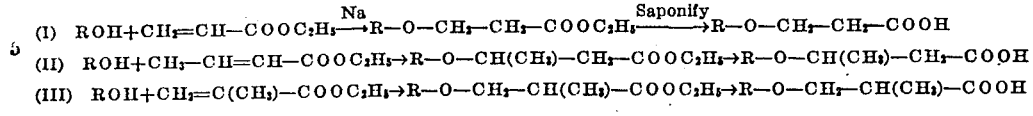

The higher homologues may be obtained from the esters of α-ethyl acrylic acid and α-ethyl-β-propyl acrylic acid.

These new acids are colorless limpid oils or waxy solids, insoluble in water, and capable of forming the oil-soluble metallic soaps of the kind herein set forth, upon heating with the oxides, hydroxides, or carbonates of polyvalent metals or of heavy metals. They may also be converted into metal soaps which are soluble in oil (especially lead salts) by the double decomposition reaction involving treatment of a water-soluble salt of the acid such as the sodium, ammonium, or potassium salt with a water-soluble salt of the desired polyvalent metal or heavy metal, (lead nitrate for example) so as to precipitate the soap as a water-insoluble mass. This may be washed and dried for use, or dissolved in an inert organic solvent such as petroleum naphtha and used as such in solution as a siccative. Other methods generally recognized for preparing metallic soaps from acids may likewise be employed with these acids, such as heating the acid with an oxide, hydroxide, carbonate, or acetate of a heavy metal or of a polyvalent metal in a high boiling inert solvent such as xylene or kerosene. When anhydrous, the heavy metal and polyvalent metal soaps of these acids form oily or solid resinous bodies and in this condition are useful as siccatives, resins, gloss promoters, hardening agents, etc., in varnishes, nitrocellulose lacquers and in coating compositions generally. These salts may be admixed with other fatty acids, fatty oils, waxes and resins if desired in order to give them special properties.

For use as siccatives, the most important salts of the above ether acids are the cobalt, manganese, and lead salts. However the cadmium, cerium, iron, mercury, nickel, thallium, thorium, tin, unranium, vanadium, and zinc salts likewise possess siccative properties, although to a lesser degree. Certain other of the salts notably the aluminum, bismuth, berium, calcium, silver, and magnesium salts are definitely weaker siccatives but act as resinous hardening agents in coating compositions and are therefore included herein under the term "siccative". Combinations of two or more of these new salts are often useful as siccatives, for example, a mixed manganese-zinc salt, cobalt-zinc salt, lead-cobalt salt, etc. The alkali metal salts or the ammonium or amine salts of these new acids are useful as detergents; the triethanolamine salts as soaps when dissolved in petroleum distillates; and as emulsifying agents.

For the preparation of these salts commercially, according to the present process, cheap monohydric saturated alcohols having more than three carbon atoms can be used for the synthesis of the intermediate ether acids. We have found that in addition to the various butyl and amyl alcohols, very useful products are obtained by employing the higher monohydric alcohols resulting from the sulfuric acid treatment of cracked petroleum fractions as well as any of the higher monohydric alcohols boiling at about 147–250° C. or mixtures thereof, which are obtained as by-products from the catalytic synthesis of methanol from oxides of carbon and hydrogen, and which are composed essentially of primary and secondary branched-chain, aliphatic alcohols having from about 6 to 12 carbon atoms.

For example, condensation of crotonic acid ethyl ester with the 157–196° C. boiling fraction of these latter alcohols yields a mixture of isomeric octyloxybutyric acids whose polyvalent metal salts, particularly the cobalt, manganese, and lead salts are excellent siccatives.

Other individual alcohols or mixed alcohols higher than propyl such as may be obtained by the catalytic reduction of waxes, fatty acids or fatty acid esters such as of cocoanut oil or of cocoanut oil fatty acid esters may be used. These comprise mostly octyl- to lauryl alcohols. Furthermore the higher alcohols such as β-methyl-n-amyl alcohol, dihexyl alcohol, dicapryl alcohol and the like as obtained by heating respectively propyl, hexyl, or capryl alcohol with sodium or alkalies at 300–400° C. with or without pressure may be employed. It will be understood of course that mixed aliphatic alcohols will yield mixed alkoxy aliphatic acids when condensed as described further herein, and that in turn mixed salts will be obtained therefrom. Such mixed salts are included herein as equivalent to the individual salts. For example among the alcohols present in the by-product higher alcohols from the methanol synthesis there are diisopropyl carbinol; 2-methylpentanol-1; 4-methylhexanol-1; 2,4-dimethylhexanol-1; 4-methylheptanol-1; 4-methylhexanol-3; 2,4-dimethypentanol-1, and other isomers of these alcohols which are extremely difficult to separate, such as nonyl-, decyl-, and duodecyl alcohols. Other alcohols such as α-ethyl-n-hexanol from the reduction of α-ethyl β-propylacrolein may be used. These alcohols as well as their higher homologues individually or mixed are suitable for the synthesis of the ether acids herein described.

Among the hydroaromatic alcohols and aromatic alcohols suitable for the preparation of these new acids are cyclohexanol, methylcyclohexanol, menthol, borneol, fenchol, alpha-terpinol, benzyl alcohol, phenylethyl alcohol and the like.

In order to more clearly describe the general preparation of the new ether acids as mentioned herein, the following illustrative procedure is given:

A small quantity of metallic sodium (0.1 atomic equivalent) is dissolved with gentle warming to about 100° C., in 1.5 to 2 mole equivalents of an anhydrous, monohydric, saturated aliphatic alcohol having more than 3 carbon atoms or in a monohydric aromatic or hydroaromatic alcohol. When the sodium has completely dissolved, the mixture is cooled to room temperature, and with rapid stirring an anhydrous ester of an aliphatic α, β-unsaturated monobasic acid (1 mole equivalent) is added, preferably dropwise. There is practically no heat evolved. The mixture is stirred for 2 hours at room temperature (20–30° C.) then warmed at about 85° C. and kept thereat for 4 hours. The reaction product may be isolated as the ester of the ether acid by washing with water to remove the alkali and fractionating the residual oil in vacuo; or the free ether acid may be isolated by directly saponifying the crude or purified reaction product with excess of boiling sodium hydroxide solution and recovering the excess of alcohol by distillation with steam whereupon the free ether acid is liberated on acidifying the alkaline still residue with dilute sulfuric acid or other mineral acid. The ether acid separates as an oil and may be purified by rectification in vacuo.

We have found it preferable to employ the same ester of the α, β-unsaturated acid as corresponds to the ether group R which one wishes to introduce at the double bond. For example to make n-butyloxybutyric acid it is preferable to condense n-butyl alcohol with the n-butyl ester of crotonic acid. However ethyl crotonate may be used if the other esters are not available, but the yields in general will be less than if the n-butyl ester is used in the above case.

Other methods are suitable for preparing these ether acids such as condensing the alcohol (in the form of its sodium alcoholate) with monochlorinated propionic acid or its higher homologues; or by oxidizing the analogous ethers of the corresponding aldehydes, such as butyloxybutyl aldehyde and higher homologues thereof to the acid.

The following table gives the properties of the typical ether acids Column IV, obtained by condensing the alcohols indicated in Column I with the esters indicated in Column II. The ether group is believed to go into the position beta to the carboxyl.

In those spaces in Column III which are blank, the ester of the ether acid was directly saponified without isolation of the free ester to give the free ether acid shown in Column V.

ing the ether acid with 10% sodium hydroxide solution using phenolphthalein as an end point indicator and then adding a slight excess of a 10% lead nitrate or lead acetate solution and warming to about 50° C. The lead salt precipitates as a white oily mass which is thoroughly washed with hot water and dried, preferably in vacuo at 100° C. When anhydrous it forms a transparent or somewhat translucent mass.

The manganese salts of the alkoxy acids are usually pale yellow or very light brown and are harder and less sticky than the corresponding lead salts. They are easily precipitated as above by the use of manganous chloride solution.

The cobalt salts of the alkoxy acids are hard, brittle, bluish, violet or dark blue resins and are easily precipitated with cobaltous sulfate from a solution of the sodium salt of the ether acid.

Similarly the other heavy metal soaps or polyvalent metal soaps enumerated herein may be prepared.

To prepare hydrocarbon-soluble ethanol-amine soaps from the above acids, it is only necessary to heat 1 mole equivalent of triethanolamine or diethanolamine with 2 mole equivalents of these ether acids at 110° C. and remove the water formed. Pale yellow sirups are thus obtained which are readily soluble in ligroin or dry cleaners' naphtha.

An alternative method of preparing the above acids by the use of monohalogenated acids higher than acetic is as follows:

2RONa+ClC$_n$H$_{2n}$—COOH→
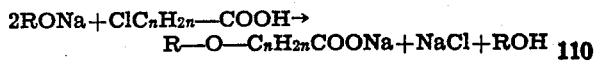
R—O—C$_n$H$_{2n}$COONa+NaCl+ROH 2 atomic equivalents of sodium are dissolved in 4 mole equivalents of any one of the alcohols mentioned herein at about 100–110° C., for example in octanol-2 (capryl alcohol). When all of

| I | II | III | IV |
|---|----|-----|-----|
| Alcohol used | Ester used | Ester obtained | Free ether acid from saponification of ester III |
| n-butanol | n-butyl crotonate B. P. 90–94° C./40 m.m. | n-butoxy-n-butyl butyrate, colorless oil—B. P. 133° C/31 m.m. | n-butoxybutyric acid B. P. 130° C./11 m.m. |
| n-pentanol | n-amylcrotonate B. P. 98° C./27 m.m. | n-amyloxy-n-amylbutyrate B. P. 137° C./8 m.m. | n-amyloxybutyric acid B. P. 132° C./5 m.m. |
| n-hexanol | n-hexyl crotonate B. P. 85–89° C./5 m.m. | n-hexyloxy-n-hexyl butyrate B. P. 160–161° C./8 m.m. | n-hexyloxybutyric acid B. P. 154–156° C./10 m.m. |
| Octanol-2 (capryl alcohol) | Sec-octyl crotonate B. P. 105–110° C./6 m.m. | Sec-octyloxy-sec-octylbutyrate B. P. 175–180° C./6 m.m. | Sec-octyloxybutyric acid B. P. 165–168° C./9 m.m. |
| Cyclohexanol | Ethyl crotonate | | Cyclohexyloxybutyric acid B. P. 157–160° C./10 m.m. |
| Borneol | Ethyl crotonate | | Bornyloxybutyric acid B. P. 182° C./12 m.m. |
| Octanol-2 (capryl alcohol) | Ethyl-α-methylacrylate CH$_2$=C(CH$_3$)—COOC$_2$H$_5$ | | Sec-octyloxyisobutyric acid B. P. 158–162° C./7 m.m. |
| Mixed hexanols B. P. 143–144° C. (mostly methyl-pentanol) from higher alcohols of methanol synthesis. | Hexyl crotonate (mixed) B. P. 102–106° C./25 m.m. (from (I) and crotonic acid). | Hexyloxy-hexyl-butyrate (mixed) B. P. 135–140° C./4 m.m. | Hexyloxybutyric acid (mixed isomers) B. P. 161° C./20 m.m. |
| 2,4-dimethyl-pentanol-1. B. P. 159.3–159.8° C. as fractionated from higher alcohols of methanol synthesis. | Heptyl crotonate B. P. 86–87° C./5 m.m. (from (I) and crotonic acid). | Heptyloxy-heptyl-butyrate B. P. 160–162° C./8 m.m. | 2,4-dimethylamyloxybutyric acid B. P. 152–153° C./9 m.m. |
| Sec-hexanols B. P. 136–139° C. (from hydrolysis of sulfuric acid wash of hexene fraction of petroleum.) | Sec-hexyl crotonates (mixed) B. P. 97–105° C./27 m.m. (from (I) and crotonic acid). | Sec-hexyloxy-sec-hexyl butyrates (mixed) B. P. 136–151° C./8 m.m. | Sec-hexyloxybutyric acid (mixed isomers) B. P. 145–154° C./12 m.m. |
| n-butanol | Ethyl-α-methylacrylate | n-butoxyisobutyric acid ethyl ester B. P. 100–113° C./10 m.m. | n-butyloxyisobutyric acid B. P. 138° C./15 m.m. |
| Amyl alcohol (mixed isomers known as "Pentasol") (registered trade mark) B. P. 112–140° C. from hydrolysis of chlorinated pentanes. | Amyl crotonate (mixed Pentasol ester) (From (I) and crotonic acid) B. P. 95–100° C./28 m.m. | Amyloxy-amyl butyrate (mixed isomers) B. P. 140–145° C./10 m.m. | Amyloxybutyric acid (mixed isomers) B. P. 137–142° C./10 m.m. |
| Benzyl | Ethyl crotonate | | Benzyloxybutyric acid B. P. 182–184° C./10 m.m. |

The lead salts of the above acids are colorless or pale yellow sticky resinous masses, and are most conveniently prepared by exactly neutralizing the sodium has dissolved the solution is cooled to about 35° C. and then with rapid stirring a solution of 1 mole equivalent β-chloropropionic acid in an equal weight of capryl alcohol is added dropwise thereto keeping the temperature below 85° C. The mixture is stirred for 4 hours after all the chloropropionic acid solution has been added and finally heated 3 hours at 120° C. to complete the reaction. The product is mixed with water and distilled with steam to recover the capryl alcohol. The clear alkaline still residue is cooled and acidified with dilute sulfuric acid whereupon β-sec-octyloxy-propionic acid separates as a pale yellow oil which is distilled in vacuo. It comes over at 159–165° C./10 m. m. In place of the free monochlorpropionic one may use its esters such as the ethyl ester in which case only 1 atomic equivalent of sodium is required for the condensation:

RONa + ClCH₂CH₂COOC₂H₅ →
R—O—CH₂CH₂COOC₂H₅ + NaCl

The free acid is obtained on boiling the reaction product with excess sodium hydroxide to saponify the ester and acidifying and rectifying the product.

In place of monochlorpropionic acid one may use monochlorbutyric acid, monochlorvaleric acid or other homologues of the series ClC$_n$H$_{2n}$—COOH where "$n$" is a whole number greater than (1) one to obtain the homoguous ether acids, in which the group R contains at least four carbon atoms.

We have found that where R is a methoxy group, ethoxy group or propyloxy group (i. e. less than 4 carbon atoms) the heavy metal salts of the corresponding ether acids possess only mediocre solubility in drying oils or petroleum hydrocarbons. For example the lead salt of β-ethoxy-oxybutyric acid is insoluble in linseed oil except at very high temperatures and is only slightly soluble in petroleum naphtha so that its use as a siccative is extremely limited as compared with the more soluble salts described herein. The heavy metal salts of ethoxycaprylic acid

C₂H₅—O—(CH₂)₇—COOH in which the acidic part of the chain is lengthened are too soapy, i. e. they produce gels in petroleum naphthas and are therefore less suitable for use as siccatives. In general the heavy metal salts of hexyloxybutyric acid, heptyloxybutyric acid and octyloxybutyric acid give the optimum solubilities in oil and the least viscous solutions in petroleum naphtha.

In general the heavy metal soaps (especially cobalt and manganese) of ether acids in which the ether group is an alkoxyl group of 6–10 carbon atoms such as hexyloxy-, heptyloxy-, octyloxy-, nonyloxy- and decyloxy-, are less soluble in water and more soluble in oil than the corresponding salts of those ether acids containing hydroaromatic or aralkyl groups of the same number of carbon atoms. For example cobalt hexyoxybutyrate is more soluble in linseed oil or in petroleum distillate and less soluble in water, than is cobalt cyclohexyoxybutyrate. Similarly manganese heptyl-oxybutyrate is more suitable for use as a siccative than manganese benzyloxybutyrate. The lead salts of these acids are however all of about the same high degree of oil solubility.

The following examples serve to illustrate the manner of employing the above compounds as siccatives:

*Example 1*

100 lbs. resin (ester gum or modified phenol-formaldehyde resin)
20 gallons raw tung oil
10 gallons linseed oil (medium bodied)
50 gallons varnish makers' naphtha The varnish was made by heating the resin and the tung oil to 560° Fahrenheit adding 5 gallons of the linseed oil and heating to body at 500° F. Then checked with the other 5 gallons of linseed oil and on cooling thinned down with the naphtha. This varnish will still be tacky after 24–48 hours and will give a frosted film. However, if there is added to the varnish a solution of 5 pounds of lead hexyloxybutyrate (lead content 1.65 lbs.) and 0.54 pound cobalt hexyloxybutyrate (cobalt content =.07 lb.) dissolved in 10 pounds petroleum naphtha such as is used for thinning varnish, the above varnish will dry hard, tack-free and clear in at the most, 10 hours.

In place of cobalt hexyloxybutyrate, an equal amount of manganese hexyloxybutyrate may similarly be used. These weights of siccative correspond to 0.7% metallic lead and 0.03% cobalt or manganese respectively based on the weight of the drying oils present.

In a similar manner one may employ equivalent amounts (based on the metal content) of other cobalt, manganese, and lead salts of the other acids of the type R—O—(C$_n$H$_{2n}$)—COOH enumerated herein, more particularly where R is a heptyl or octyl group and where "$n$" is 3, notably heptyl- or octyloxybutyric acid and octyl-oxyisobutyric acid.

The corresponding lead salts of benzyloxybutyric or cyclohexyloxybutyric acid may likewise be used above.

*Example 2*

Baking varnish
150 lbs. resin (modified ester gum type)
10 gal. tung oil
5 gal. linseed oil
33 gal. varnish makers' naphtha The varnish was prepared by heating the resin and the tung oil to 560° F. adding 3 gal. linseed oil and bodying at 500° F. then adding 2 gal. linseed oil and reducing at 450° F. with the naphtha. When cool add a naphtha solution containing 5 lbs. of lead β-heptyloxypropionate and 0.54 lb. of manganese or cobalt β-heptyloxypropionate. This addition will reduce the baking time at 150° F. by one half to give a hard dry film. The β-heptyloxypropionic acid was made by condensing the sodium alcoholate of 2,4-dimethyl pentanol-3 with β-chlorpropionic acid.

*Example 3*

An "alkyd" resin made by heating 200 grams phthalic anhydride with 110 grams linseed oil fatty acids, 110 grams glycerol, and 60 grams linseed oil for 12½ hours at 180–185° C. and having an acid number 18.8, was dissolved in its own weight of xylene. This solution requires at least 12 hours to dry to a tack-free film. Upon adding 0.4 gram cobalt heptyl-oxybutyrate dissolved in 5 grams xylene to the resin solution, the film obtained therefrom will dry in at most 6 hours. The cobalt heptyl-oxybutyrate may be replaced by an equal weight of manganese β-hexyloxybutyrate.

Other methods of using these salts as siccatives, such as incorporation directly in oil varnishes on the down heat as is generally practiced in the art, or grinding with a drying oil vehicle on paint mills, may be employed.

What we claim is:

1. In the process of accelerating the rate of drying of autoxidizable coating compositions, the step which comprises incorporating therewith a polyvalent metal salt of an ether acid having the formula $$R—O—C_nH_{2n}—COOH$$

wherein R is an alkyl radicle having more than three carbon atoms; a hydroaromatic radicle; or an aralykyl group and "$n$" is a whole number greater than one.

2. In the process of accelerating the ratio of drying of autoxidizable coating compositions, the step which comprises incorporating therewith a heavy metal salt of an ether acid having the formula $$R—O—C_nH_{2n}—COOH$$

wherein R is an alkyl radicle having more than 3 carbon atoms; a hydroaromatic radicle, or an aralkyl group; and "$n$" is a whole number greater than one.

3. In the process of accelerating the rate of drying of autoxidizable coating compositions, the step which comprises incorporating therein a metal salt of an ether acid having the formula $$R—O—C_nH_{2n}—COOH$$

wherein R is an alkyl radicle having more than three carbon atoms; a hydroaromatic radicle or an aralkyl group; and "$n$" is a whole number greater than one; the metal radicle of said salt being one of the group consisting of cobalt, manganese, and lead.

4. In the process of accelerating the rate of drying of autoxidizable coating compositions, the step which comprises incorporating therein a polyvalent metal salt of an acid having the formula $$R—O—C_3H_6—COOH$$

wherein R is an alkyl radicle having more than 3 carbon atoms; a hydroaromatic radicle or an aralkyl group.

5. In the process of accelerating the rate of drying of autoxidizable coating compositions, the step which comprises incorporating therein a polyvalent metal salt of an alkoxybutyric acid in which the alkoxy group contains more than 3 carbon atoms.

6. In the process of accelerating the rate of drying of autoxidizable coating compositions, the step which comprises incorporating therein a polyvalent metal salt of an alkoxyisobutyric acid in which the alkoxy group contains more than 3 carbon atoms.

7. In the process of accelerating the rate of drying of autoxidizable coating compositions, the step which comprises incorporating therein a metal salt of an alkoxybutyric acid, the metal radicle of which is a member of the group consisting of cobalt, manganese, and lead, and in which the alkoxy group contains from 4 to 12 carbon atoms inclusive.

8. In the process of accelerating the rate of drying of autoxidizable coating composition, the step which comprises incorporating therein a metal salt of a hexyloxybutyric acid, the metal radicle of which is a member of the group consisting of cobalt, manganese, and lead.

9. In the process of accelerating the rate of drying of autoxidizable coating compositions, the step which comprises incorporating therein a metal salt of a heptyloxybutyric acid, the metal radicle of which is a member of the group consisting of cobalt, manganese and lead.

10. In the process of accelerating the rate of drying of autoxidizable coating compositions, the step which comprises incorporating therewith a metal salt of an octyloxybutyric acid, the metal radicle of which is a member of the group consisting of cobalt, manganese and lead.

11. A coating composition containing a polyvalent metal salt of an acid having the formula $$R—O—C_nH_{2n}—COOH$$

wherein R is an alkyl radicle having more than 3 carbon atoms; a hydroaromatic radicle; or an aralkyl group and wherein "$n$" is a whole number greater than 1.

12. A coating composition containing as a siccative a heavy metal salt of an acid having the formula $$R—O—C_nH_{2n}—COOH$$

wherein R is an alkyl radicle having more than 3 carbon atoms; a hydroaromatic radicle; or an arakyl group and "$n$" is a whole number greater than 1.

13. A coating composition containing as a siccative a polyvalent metal salt of an acid having the formula $$R—O—C_3H_6—COOH$$

wherein R is an alkyl radicle having more than 3 carbon atoms; a hydroaromatic radicle; or an aralkyl group.

14. A composition adapted for use as a coating material containing an autoxidizable resinous substance and a polyvalent metal salt of an alkoxybutyric acid in which the alkoxy group contains from 4 to 12 carbon atoms inclusive.

15. A composition adapted for use as a quick drying coating material, containing autoxidizable resinous substances and a metal salt of an alkoxybutyric acid in which the alkoxy group contains from 4 to 12 carbon atoms inclusive; the metal radicle of which is a member of the group consisting of cobalt, manganese, and lead.

16. A composition adapted for use as a coating material containing an autoxidizable oleo-resinous substance and a polyvalent metal salt of a heptyloxybutyric acid.

17. A composition adapted for use as a coating material containing an autoxidizable oleo-resinous substance and a polyvalent metal salt of an alkoxybutyric acid in which the alkoxy group is derived from the monohydric alcohols boiling substantially at 157-196° C. which are obtained as a by product in the production of synthetic methanol from hydrogen and carbon oxides.

18. A composition adapted for use as a coating material containing an autoxidizable oleo-resinous substance and a polyvalent metal salt of an octyloxybutyric acid.

19. An oleoresinous varnish containing a lead salt of heptyloxybutyric acid as a siccative.

20. An oleoresinous varnish containing a manganese salt of heptyloxybutyric acid as a siccative.

21. An oleoresinous varnish containing a cobalt salt of heptyloxybutyric acid as a siccative.

HERMAN A. BRUSON.
OTTO STEIN.